Patented Nov. 10, 1936

2,060,382

UNITED STATES PATENT OFFICE 2,060,382

TRIMETHINE-CYANINE DYES

Wilhelm Schneider, Dessau in Anhalt, Germany, assignor to Agfa Ansco Corporation, Binghamton, N. Y., a corporation of New York No Drawing. Application March 16, 1933, Serial No. 661,185. In Germany March 18, 1932

8 Claims. (Cl. 260—44)

My present invention relates to the manufacture of dyes of the polymethine series.

I have found that dyestuffs of the polymethine series may be obtained which are substituted at the central carbon atom of the polymethine chain by causing a quaternary ammonium salt of a base containing in α-position a methyl-group capable of reaction and corresponding, for instance with the general formula

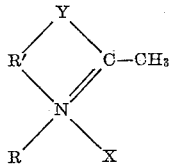

wherein R stands for alkyl; R' stands for vinylene, phenylene, naphthylene, or a polynuclear ring system; Y stands for

oxygen, sulfur, selenium ($R_1$ and $R_2$ stands for alkyl or aryl) and X stands for Cl, Br, I, $SO_4CH_3$, $ClO_4$ or an other acid radical to react with an alkyl ester of an ortha-α-thiophenic acid corresponding with the formula

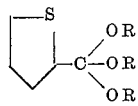

wherein R stands for alkyl.

The reaction is preferably carried out in the presence of a condensing agent or a solvent, for instance pyridine, acetic acid and nitrobenzene. Instead of a non-substituted alkyl ester of ortho-α-thiophenic acid there may also be employed a substituted ortho ester. The dyestuffs obtained according to my process are therefore substituted at the central carbon atom of the polymethine chain with the thienyl group or a substituted thienyl group. The dyes are suitable for sensitizing photographic silver-halide emulsions. Their range of absorption is considerably displaced towards the long-wave region, as compared with that of the known dyes substituted by an alkyl or an aryl radical. Besides, most of the dyes possess a second maximum of absorption. For the condensation there may be used the methylene base, i. e., pseudo-base instead of the corresponding quaternary ammonium salts.

The following examples serve to illustrate the invention:

Example 1.—The tri-ethyl ester of ortho-α-thiophenic acid may be obtained as follows: thienylmagnesium-iodide is prepared by the method of Grignard from 1 molecular proportion of α-iodothiophene, 1 atomic proportion of magnesium and ten times the volume of anhydrous ether. To the ethereal solution is then added gradually whilst cooling, 1 molecular proportion of tetra-ethyl ortho-carbonic acid ester and when the reaction is completed the ether is distilled on the water-bath. The residue is mixed with ice and exactly neutralized by addition of dilute acetic acid. The triethyl ester of ortho-α-thiophenic acid is extracted by means of ether, the ethereal extract is dried by means of potassium carbonate and after removal of the ether the residue is distilled under reduced pressure. The ester boils at about 110–120° C. under a pressure of 30 mm.

Example 2.—1 part by weight of 2-methylbenzoxazole-ethiodide, 1 part by weight of the ethyl ester of ortho-α-thiophenic acid and 2 parts by weight of pyridine are heated to 120° C. for about 1 hour. The formed dye bis-[3-ethyl-benzoxazole-(2)]-β-thienyl-trimethine-cyanine iodide is precipitated from the reaction mixture by the addition of ether and recrystallized from alcohol.

The alcoholic solution of the dye has an absorption maximum at a wave length of about 495 μμ.

Example 3.—1 part by weight of 2-methylbenzthiazole-diethyl sulfate, 1 part by weight of ortho-thiophenic acid ethyl ester and 3 parts by weight of pyridine are heated for about 1 hour to 120° C. From the reaction mixture the dye bis-[3-ethyl-benzthiazole-(2)]-β-thienyl-trimethine-cyanine bromide is precipitated with an aqueous solution of potassium bromide and recrystallized from alcohol.

The alcoholic solution of the dye has absorption maxima at about 535 μμ and about 575 μμ.

Example 4.—5 parts by weight of 2-methyl-α-naphtho-thiazolediethyl-sulfate, 1 part by weight of orthothiophenic acid ester and 4 parts by weight of pyridine are heated for about 1 hour to 120° C. From the reaction mixture the dye bis-[3-ethyl-naphtho-2'.1'-4.5-thiazole-(2)]-β-thienyltrimethine-cyanine bromide is precipitated with an aqueous solution of potassium bromide and recrystallized from alcohol.

The alcoholic solution of the dye has absorption maxima at about 545 μμ and about 595 μμ.

Example 5.—1 part by weight of benzselenazole-dimethyl-sulfate, 1 part by weight of orthothiophenic acid ester and 4 parts by weight of pyridine are heated for about 1 hour to 120° C. From the reaction mixture the dye bis-[3-ethyl-benzoselenazole-(2)]-β-thienyl-trimethine-cyanine bromide is precipitated with an aqueous solution of potassium bromide and recrystallized from alcohol.

The alcoholic solution of the dye has absorption maxima at about 565μμ and 610μμ.

What I claim is:

1. The process of manufacturing a trimethine dye which comprises causing the salt of a base corresponding with the general formula

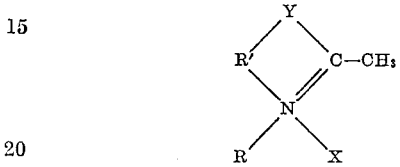

wherein R stands for alkyl, R' stands for a member of the group consisting of phenylene and naphthylene, Y stands for a member of the group consisting of oxygen, sulfur and selenium and X stands for an anion capable of precipitating a trimethine dye to react with an alkyl ester of an ortho-α-thiophenic acid.

2. The process which comprises heating a mixture of 1 part by weight of 2-methylbenzoxazole-ethiodide, 1 part by weight of ortho-α-thiophenic acid ethyl ester and 2 parts by weight of pyridine to 120° C. for about 1 hour and precipitating the formed dye from the reaction mixture.

3. The process which comprises heating a mixture of 5 parts by weight of 2-methyl-α-naphthothiazolediethyl-sulfate 1 part by weight of ortho-α-thiophenic acid ethyl ester and 4 parts by weight of pyridine to 120° C. for about 1 hour and precipitating the formed dye from the reaction mixture.

4. The process which comprises heating a mixture of 1 part by weight of benzselenazoledimethyl-sulfate, 1 part by weight of ortho-α-thiophenic acid ethyl ester and 4 parts by weight of pyridine to 120° C. for about 1 hour and precipitating the formed dye from the reaction mixture.

5. The dye bis-[3-ethyl-benzoxazole-(2)]-β-thienyl-trimethine-cyanine iodide having in its alcoholic solution an absorption maximum at about 495μμ.

6. The dye bis-[3-ethyl-naphtho-2'.1'-4.5-thiazole-(2)]-β-thienyl-trimethine-cyanine bromide having in its alcoholic solution absorption maxima at about 535μμ and about 575μμ.

7. The dye bis-[3-ethyl-benzoselenazole-(2)]-β-thienyl-trimethine-cyanine bromide having in its alcoholic solution absorption maxima at about 565μμ and about 610μμ.

8. A trimethine-cyanine salt corresponding with the formula

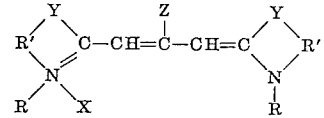

wherein Z stands for a thienyl, R stands for alkyl, R' stands for a member of the group consisting of phenylene and naphthylene, Y stands for a member of the group consisting of oxygen, sulfur and selenium and X stands for an anion capable of precipitating the dye.

WILHELM SCHNEIDER.